US008880698B2

(12) United States Patent
Foster et al.

(10) Patent No.: US 8,880,698 B2
(45) Date of Patent: Nov. 4, 2014

(54) STORAGE OF CONTENT DATA IN A PEER-TO-PEER NETWORK

(75) Inventors: Richard Foster, Fordingbridge (GB); Isabel Delacour, Poole (GB); Paul Maurice Otto Gugenheim, London (GB)

(73) Assignee: Sony United Kingdom Limited, Weybridge (GB)

( * ) Notice: Subject to any disclaimer, the term of this patent is extended or adjusted under 35 U.S.C. 154(b) by 1509 days.

(21) Appl. No.: 11/251,231

(22) Filed: Oct. 14, 2005

(65) Prior Publication Data

US 2006/0085385 A1  Apr. 20, 2006

(30) Foreign Application Priority Data

Oct. 18, 2004  (GB) .................................. 0423100.7

(51) Int. Cl.
*G06F 15/173* (2006.01)
*G06F 15/16* (2006.01)
*G06F 17/30* (2006.01)
*H04L 29/08* (2006.01)

(52) U.S. Cl.
CPC .......... *G06F 17/3012* (2013.01); *H04L 67/06* (2013.01); *G06F 17/30109* (2013.01); *G06F 17/30206* (2013.01); *G06F 17/30* (2013.01); *H04L 67/104* (2013.01)
USPC ........................................ 709/226; 709/203

(58) Field of Classification Search
CPC .............. G06F 17/3012; G06F 17/30; G06F 17/30109; G06F 17/30206; H04L 67/06; H04L 67/104
USPC ............. 709/226, 203; 707/999.001
See application file for complete search history.

(56) References Cited

U.S. PATENT DOCUMENTS 6,789,095 B2 *  9/2004  Okuda et al. ..................... 1/1
7,206,934 B2 *  4/2007  Pabla et al. ................ 713/168

(Continued)

FOREIGN PATENT DOCUMENTS

EP  1 217 803  6/2002
EP  1 248 441  10/2002

(Continued)

OTHER PUBLICATIONS

Proceedings 16th International Parallel and Distributed Processing Symposium, Hung-Chang Hsiao; Chung-Ta King, "Modeling and evaluating peer-to-peer storage architectures", Apr. 15-19, 2002, IEEE Comput. Soc.

(Continued)

*Primary Examiner* — Lynn Feild
*Assistant Examiner* — Herman Belcher
(74) *Attorney, Agent, or Firm* — Oblon, Spivak, McClelland, Maier & Neustadt, L.L.P.

(57) ABSTRACT

In a peer-to-peer network of peers which are interconnected for sharing content data, the peers store content files of content data in a file structure comprising a plurality of content folders each content folder containing any number of content files of related content data, and a description file containing both unique identification information and descriptive information in XML format describing the content file or files stored in the same content folder. Requesting peers transmit search query messages which specify search criteria for passage through the network. Peers receiving a search query message compare the search criteria with the descriptive information contained in the description files in each of their plurality of content folders and in the event of there being a matching content folder transmit a hit message including the identification information to identify the matching content folder for passage back through the network to the respective requesting peer.

22 Claims, 7 Drawing Sheets

(56) References Cited

U.S. PATENT DOCUMENTS

| | | | |
|---|---|---|---|
| 7,263,560 B2 * | 8/2007 | Abdelaziz et al. | 709/238 |
| 7,325,038 B1 * | 1/2008 | Wang | 709/216 |
| 2002/0049760 A1 | 4/2002 | Scott et al. | |
| 2002/0051015 A1 | 5/2002 | Matoba | |
| 2002/0062310 A1 * | 5/2002 | Marmor et al. | 707/3 |
| 2002/0114341 A1 | 8/2002 | Sutherland et al. | |
| 2002/0138471 A1 * | 9/2002 | Dutta et al. | 707/3 |
| 2002/0138744 A1 | 9/2002 | Schleicher et al. | |
| 2002/0147815 A1 | 10/2002 | Tormasov et al. | |
| 2002/0188735 A1 | 12/2002 | Needham et al. | |
| 2002/0194355 A1 * | 12/2002 | Morita et al. | 709/231 |
| 2003/0018930 A1 | 1/2003 | Mora et al. | |
| 2003/0061243 A1 * | 3/2003 | Kim et al. | 707/200 |
| 2003/0063770 A1 | 4/2003 | Svendsen et al. | |
| 2003/0187950 A1 * | 10/2003 | Rising, III | 709/218 |
| 2003/0187974 A1 * | 10/2003 | Burbeck et al. | 709/224 |
| 2003/0233241 A1 * | 12/2003 | Marsh | 705/1 |
| 2004/0024877 A1 * | 2/2004 | Celle | 709/226 |
| 2004/0070678 A1 | 4/2004 | Toyama et al. | |
| 2004/0205172 A1 * | 10/2004 | Kim | 709/222 |
| 2004/0249888 A1 * | 12/2004 | Berkey et al. | 709/204 |

FOREIGN PATENT DOCUMENTS

| | | |
|---|---|---|
| EP | 1 298 854 | 4/2003 |
| WO | WO 01/33542 | 5/2001 |
| WO | WO 02/15035 | 2/2002 |
| WO | WO 02/51057 | 6/2002 |
| WO | WO 02/089000 | 11/2002 |
| WO | WO 0385559 | 10/2003 |

OTHER PUBLICATIONS

Proceedings 2003 Symposium on Applications and the Internet, Kwon G; Ryu KD, "An efficient peer-to-peer file sharing exploiting hierarchy and asymmetry", Jan. 27-31, 2003, IEEE Comput. Soc.

\* cited by examiner

Fig.3.
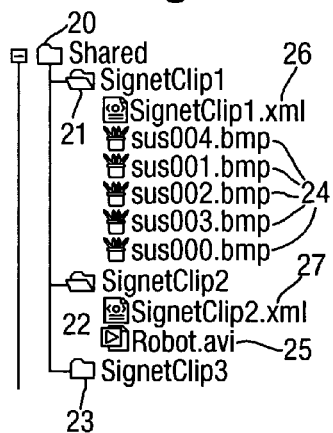
Fig.4.
```
<?xml version="1.0" ?>
- <advq>
    <id>Clip ID</id>
    <name>Clip Name</name>
    <ext>Extension</ext>
    <cmpny>Company</cmpny>
    <colspc>Colour Space</colspc>
    <res>Resolution</res>
    <fmt>Format</fmt>
  - <kwds>
      <kwd>Keyword1</kwd>
      <kwd>Keyword2</kwd>
      <kwd>Keyword3</kwd>
    </kwds>
  </advq>
```
Fig.5.
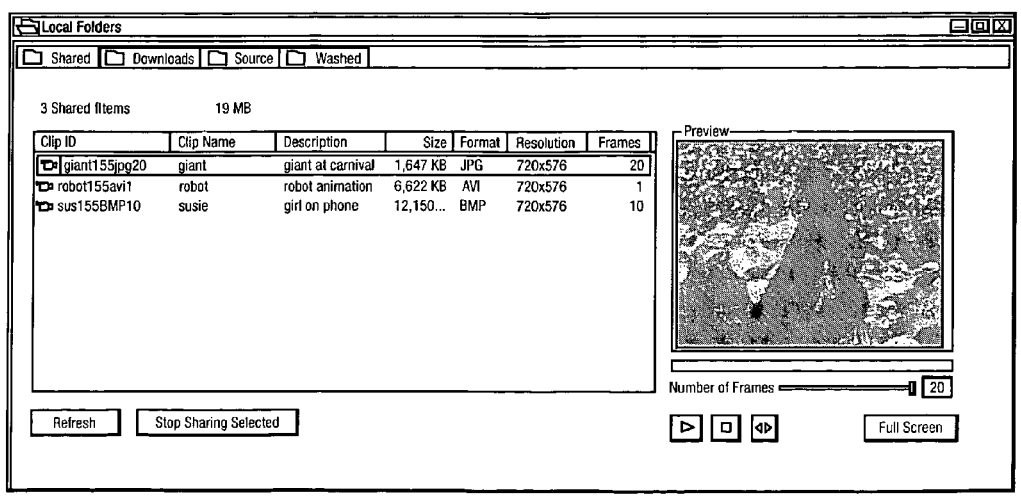

| Clip Details | | Output Sequence Details | |
|---|---|---|---|
| Clip ID | GAINT0001101110010010 | Frames | 1  Output Format  JPG |
| Name | Rio Carnival | Resolution | 720x576  Colour Space  RGB |
| Description | Annual Carnival in Rio, Brazil | | |
| Keywords | carnival festival rio | Template | |
| Company | Sony | | 1 |

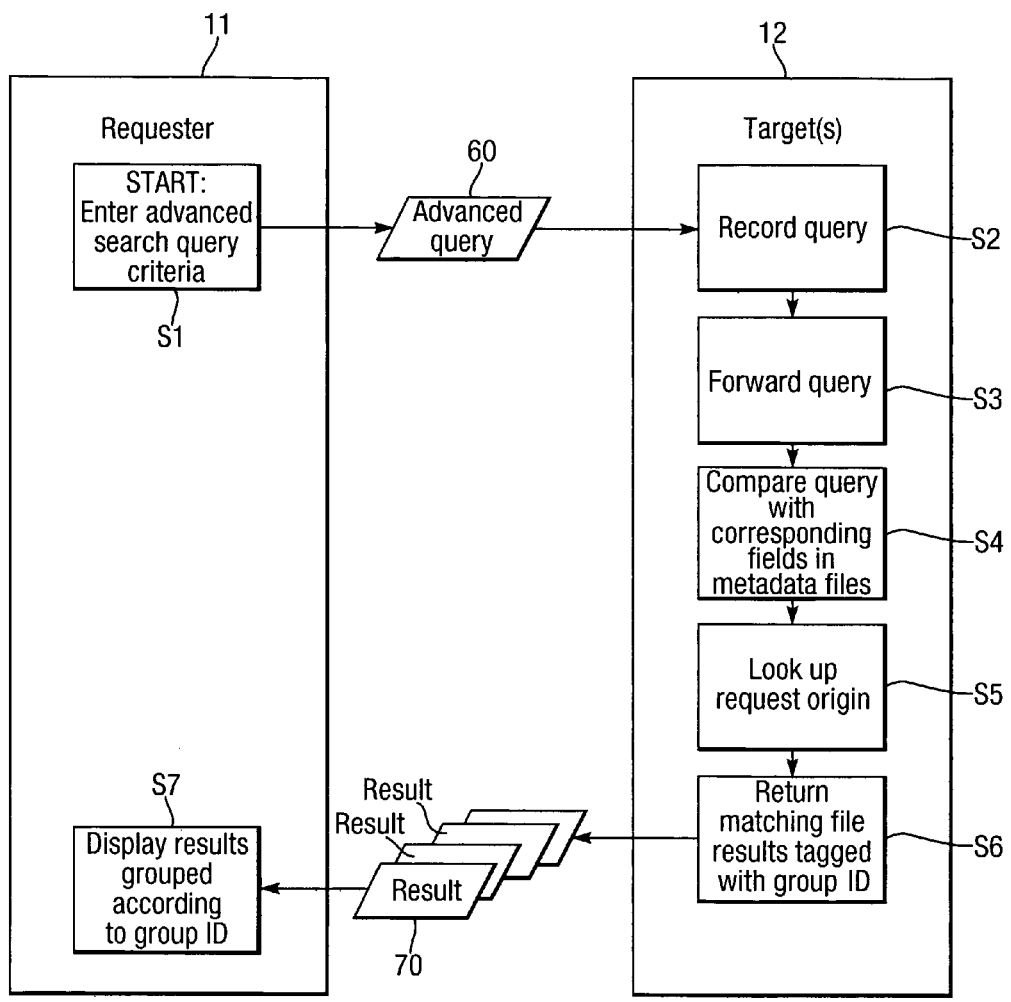

Fig.10.
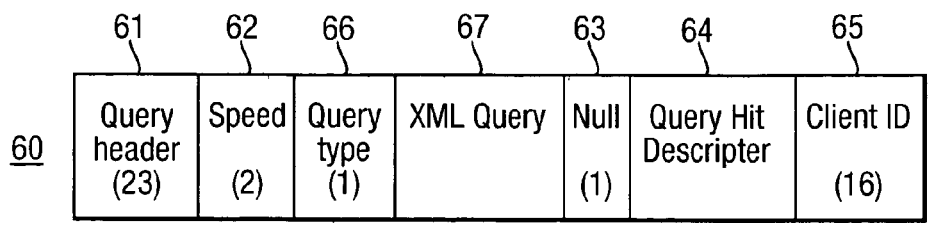
Fig.11.
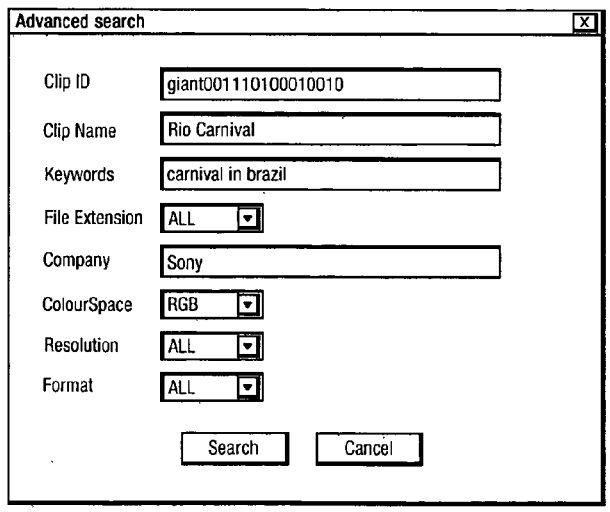
Fig.13.
| Clip ID | Clip Name | Description | Size | Format | Resolution | Frames |
|---|---|---|---|---|---|---|
| giant155jpg20 | giant | giant at carnival | 1,647 KB | JPG | 720x576 | 20 |
| robot155avi1 | robot | robot animation | 6,622 KB | AVI | 720x576 | 1 |
| sus155BMP10 | susie | girl on phone | 12,150 | BMP | 720x576 | 10 |

STORAGE OF CONTENT DATA IN A PEER-TO-PEER NETWORK

CROSS-REFERENCE TO RELATED APPLICATION

The outstanding application claims priority under 35 U.S.C. §119 to U.K. patent application 0423100.7, filed on Oct. 18, 2004.

FIELD OF THE INVENTION

The present invention relates to a peer-to-peer network, in particular to the storage of content data on a peer-to-peer network.

DESCRIPTION OF RELATED ART

A peer-to-peer network is a network of interconnected computers known as peers having a topology and architecture to facilitate sharing of content data or resources between the peers. In general terms, the peers have equivalent responsibilities and, for at least some tasks, communicate directly with each other to share content data or resources, resulting in sharing of infrastructure and bandwidth. This contrasts with a traditional client/server model in which a server stores resources accessed by a large number of clients.

In a pure (or decentralised) peer-to-peer network, all peers have identical responsibilities and all communication is symmetric. Examples of pure peer-to-peer protocols are Gnutella and Freenet. In a centralised peer-to-peer network, such as Napster, peers connect to a central server storing an index of all the connected peers together with their available files to carry out searches, but then make direct connections to other peers to download content data located in the search.

In commonly used existing protocols such as Gnutella, search protocols include searching based on file names or other file properties made available by the operating system and searching based on an examination of the data inside the content files. Typically, the results of the search identify specific content files meeting the search criteria. Such approaches make it difficult to search effectively for content data of interest. The search protocols are not powerful and in practice often result in failure to locate all the files of interest or else result in identification of large numbers of files within which the actual files of interest are hidden. This has effects both on the user and on the network. Considering the user, searches need to be refined and repeated, thus taking a long time and possibly being unsuccessful. Considering the network, repeated searches and large results sets cause excessive age of bandwidth.

BRIEF SUMMARY OF THE INVENTION

The present invention is concerned With reducing these problems with common existing search protocols of peer-to-peer networks.

The present invention provides a peer-to-peer network of peers which are interconnected for sharing content data, wherein respective peers in the network are arranged to store content files of content data in a file structure comprising a plurality of content folders, each content folder containing
any number of content files of related content data, and
a description file containing descriptive information describing the content ile or files stored in the same content folder.

Such a file structure allows a group of related content files to be stored in a single content folder, effectively abstracting the group as a single object. This is combined with the provision of the description file. These measures together greatly facilitate searching of the content data stored on the peer. The descriptive information in the description file may be used as the basis for the search. This provides a powerful searching technique improving over techniques relying on the names or other properties of the content files or on examination of the actual content data of the content files. Furthermore, in the search results the content folder may be identified allowing access to all the related content files. Thus the grouping of files at the time of storage provides more complete results to be provided on searching.

Although the present invention is applicable to a centralised peer-to-peer network, it provides particular advantage when applied to a decentralised peer-to-peer network, for example in which: the peers are arranged to pass through the network messages which originate from respective requesting peers; said respective requesting peers are arranged to transmit a search query message which specifies search criteria for passage through the network; and said respective peers storing content files are arranged, after receipt of a search query message which specifies search criteria, to compare the search criteria with the descriptive information contained in the description files in each of said plurality of content folders, and in the event of there being a matching content folder to transmit a hit message identifying the matching content folder for passage back through the network to the respective requesting peer.

Advantageously, in order to identify the content folder each description file further contains identification information and the hit message identifies the matching content folder by including the identification information of the description file which contains the descriptive information matching the search criteria.

Advantageously, each of said plurality of content folders is arranged within in a common folder. This improves the security of the network as distribution of shared content files outside the common folder would be difficult to secure.

The description file may contain the descriptive information in XML format which facilitates adaption of the descriptive information.

For downloading of the content data, said respective requesting peers may be arranged, after receipt of a hit message to connect directly to the respective peer which generated the hit message and download the content file or files in the matching content folder.

An alternative possibility to allow for the selective download of content files within a given content folder is that said respective requesting peers arranged to transmit, after receipt of a hit message, a file list query message identifying the matching content folder for passage to the respective peer which generated the hit message; and said respective peers storing content files are arranged, after receipt of a file list query message, to transmit for passage back through the network to the requesting peer a file list response message which identifies the content file or files in the matching content folder. This allows for said respective requesting peers to be arranged, after receipt of a file list response message, to accept inputs from a user specifying any content file or files specified in the file list response message and to connect directly to the respective peer which generated the hit message and download the files specified by the user.

Besides the peer-to-peer network as a whole, the present invention also provides an individual peer arranged to connect into the a peer-to-peer network, a peer-to-peer application capable of execution on a computer system to cause the computer system to act as the peer, a storage medium storing the peer-to-peer application and a corresponding method of storing content data in a peer-to-peer network.

To allow better understanding, an embodiment of the present invention will now be described by way of non-limitative example, with reference to the accompanying drawings.

BRIEF DESCRIPTION OF THE DRAWINGS

In the drawings:

FIG. 3 is a tree diagram of an example of a file structure;

FIG. 4 is an example of an XML data file;

FIG. 5 is a window of the application providing a view on the shared content folders;

FIG. 9 is a flow chart of the searching process;

FIG. 10 is a diagram of the format of an advanced search message;

FIG. 11 is a window of the application for accepting inputs of search criteria;

FIG. 13 is a window of the application for displaying search results;

DETAILED DESCRIPTION OF THE INVENTION

Figure 1:
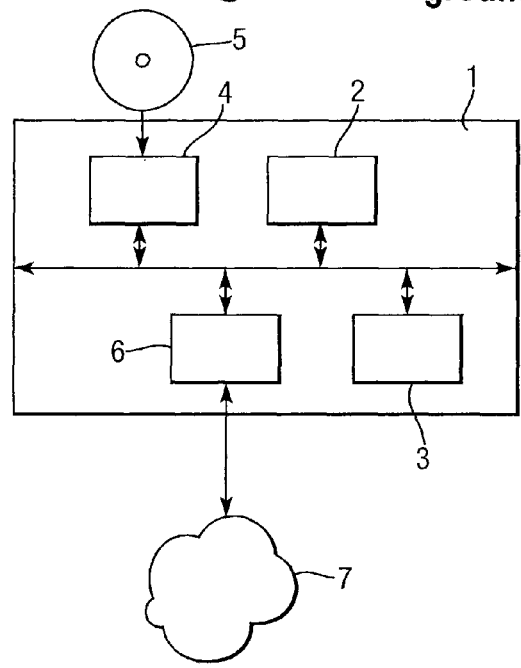
FIG. 1 is a schematic view of a personal computer capable of acting as a peer in a peer-to-peer network.

There will now be described a protocol for a peer-to-peer network which embodies the present invention. The present protocol may be implemented in a peer-to-peer application to be executed on a computer system, for example a conventional personal computer 1 as shown in FIG. 1 and including a processor 2, a memory 3, a drive 4 for reading a recording medium 5, and an interface 6 for connecting the personal computer to other computer systems, for example over the Internet 7 or a private connection. The peer-to-peer application may be stored on a storage medium, for example the memory 3 or the recording medium 5. On execution of the peer-to-peer application, the computer system acts as a peer in a peer-to-peer network by connecting via the interface 6 to other computer systems executing an equivalent application.

The present protocol is a modified version of the Gnutella protocol, which is widely known and has several open-source applications, for example MFC Gnucleus. Accordingly, the Gnutella protocol will not be described in detail, but for clarity there will first be given a brief overview of the relevant aspects of the Gnutella protocol which apply equally to the present protocol.

The Gnutella protocol is a pure peer-to-peer protocol using a distributed model without relying on a central server with its associated costs and risk of failure. A peer provides searching capabilities as well as file serving capabilities. As a peer may be thought of as acting as both a client and a server at different times, it is sometimes referred to as a servent. Peers connect to the network by connecting to peer already in the network, for example using an index of other users (a host cache).

Each peer stores content files of content data. In general, the content data may be of any type including, but not exclusively, image data, audio data, documents and software.

The Gnutella protocol is message-based. Peers generate messages which are passed through the network by means of each peer transmitting messages it generates or receives to one or more peers to which it is connected. Two types of routing of messages are applied. For passing query messages originating from a requesting peer, a broadcast routing mechanism is used in which each peer transmits messages to all peers having a connection thereto. Any peer receiving a query message can generate a response message. A response message is routed to pass back to the requesting peer.

Figure 2:
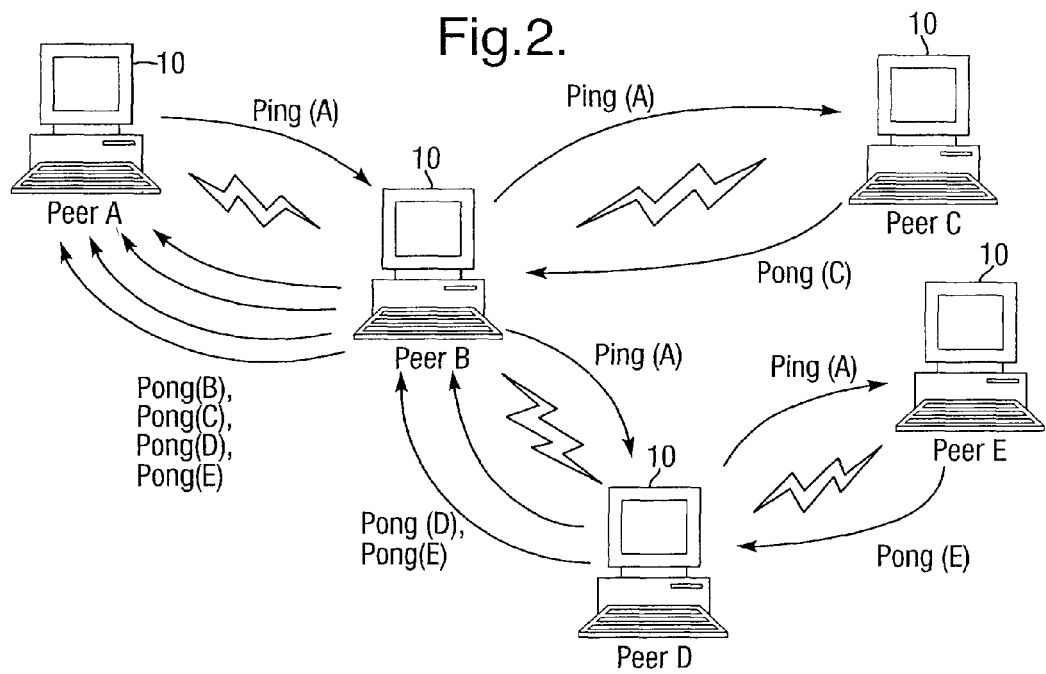
FIG. 2 is a diagram of a peer-to-peer network illustrating the passage of ping and pong messages.

As an example of the routing of query messages and response messages, FIG. 2 shows the routing in a network of five peers 10 labelled A to E of a ping message which is a query message for checking the connection status of previously connected peers and pong messages which are response messages in response to a ping message. In FIG. 2, a ping message is generated and transmitted by peer A and is passed through the network to all the other peers B to E. Pong messages are generated and transmitted in response and are passed back through the network to the requesting peer A.

In order to prevent messages from travelling forever, the Gnutella protocol implements the idea of message decay. A message starts out with a number of hops it may travel before expiring, called the TTL (time to live). At each transmission from one peer to the next, the TTL is decremented. When the TTL reaches zero, the request message is no longer transmitted and is said to have reached the horizon for the requesting peer.

Networks propagating request messages with a high time-to-live can incur scaling problems. The messages can spread exponentially and flood the system with requests. This can cause great disruption to the network, so typical implementations limit the TTL to 7. This imposes a horizon on each user, but reduces the chance of network overload.

Messages are distinguished using unique identifiers and are not tagged with IP addresses. As messages pass through each peer, the message identifiers are saved in dynamic routing tables store in memory. These tables are used to lookup the peers which packets should be sent to next. This system makes it difficult to determine which peer is the requesting peer, except by forensically examining successive dynamic routing tables. However, this anonymity is lost when results messages are returned or download requests are made, in which cases the IP addresses are revealed.

There is no idea of a persistent connection between any two arbitrary peers on a Gnutella network. They are both on the network but not directly connected to each other in any predictable or stable fashion. Ping messages are sent out periodically by peers to check the status of the connections to other peers. Those peers that reply with a pong message within a given time limit remain in the connections list. Those peers that do not respond are assumed to be disconnected. When a peer leaves the network, it does not disrupt the network. The peers connected to the departing peer simply clean up their memories to forget the departing peer and things continue as normal. Over time the network adapts its shape to long-lived peers, but even if the longest-lived, highest capacity peer were to disappear, there would be no lasting adverse effects.

The Gnutella protocol copes with the constantly changing infrastructure by creating an ad hoc backbone. There is a varying speed of Internet connections. Some are slow, for example 56 Kbs modems, and others are fast, for example T3 lines. Over time, the fast peers migrate towards the centre of the network and carry the bulk of the traffic, while the slow peers move out toward the fringes of the network where they will not carry as much traffic.

Searching is implemented by a requesting peer generating a search query message, which specifies search criteria, and transmitting the search query message for passage through the network. For example, in the network shown in FIG. 2, the search query messages are transmitted in the same manner as the ping messages. On receipt of a search query message, the respective peers (as well as transmitting the message on) use the search criteria to search their own stored content data. In the event of a match, the respective peers generate and transmit back a hit message. The hit message is a response message which is passed back through the network to the respective requesting peer. For example in the network shown in FIG. 2, the hit messages are transmitted in the same manner as the pong messages except of course that hit messages are only generated in peers where the search produces a match.

In the Gnutella protocol, the hit message identifies the located content file and address of the respective peer which generated the hit message, thereby allowing the requesting peer to connect directly thereto and download the content file. This is an aspect of the Gnutella protocol which is modified in the present protocol as described below.

The modifications of the Gnutella protocol in the present protocol will now be described.

The present protocol was designed for the purpose of sharing audio/visual (A/V) data in a professional environment. As such, the modifications provide particular benefits in this context.

The present protocol uses an approach which abstracts any number (one or more) of content files of related content data as a single object. Hereinafter, the one or more content files will be called a "clip". Typically, a clip is a piece of footage that consists of one or more A/V files to represent the sequence of frames. For example, a clip may be a number of bitmap files, or it may be a single AVI file. A clip could also be a single still image file. Of course, in general the content files may contain any type of content data.

To achieve this abstraction, the present protocol uses a file structure comprising a plurality of content folders. Each content folder can contain any number of content files of related content data, which together constitute a clip. Each of the content folders is arranged in a common shared folder. This improves security as all content files in the shared folder may be shared, but there are no content files to be shared outside the content folder.

FIG. 3 illustrates an example of such a file structure having a single shared folder 20 in which three content folders 21, 22 and 23 are arranged. In the first content folder 21, there are several content files 24, in this case bit-map files. In the second content folder 22, there is a single content file 25, in this case an AVI file.

In contrast, the Gnutella protocol has no concept of grouping files into an abstract object and gives no any indication as to where files should be stored on each peer. Most applications have a default folder where shared files can be stored. Even if the user modifies the file structure, the files are maintained in a single indexed list regardless of the underlying folder hierarchy.

In addition in the present protocol, each content folder contains a description file in XML format. In the example shown in FIG. 3, the first content folder 21 has a description file 26 and the second content folder 22 has a description file 27.

Each description file contains metadata, in particular identification information and descriptive information describing the content file or files stored in the same content folder.

The identification information of each description file is unique within the network and serves to identify the content folder and hence the clip stored therein. The identification information may be a Unique Material Identifier (UMD) Unique naming of groups facilitates re-sharing as there will not be conflicts with existing shared subfolders In the hereinafter described examples, the identification information is called the "clip ID".

The descriptive information is used for searching. Providing descriptive information separately from the content files themselves facilitates a powerful searching technique. The use of XML means that the description file is extensible and could be modified to contain any kind of data. It is simple to find and extract fields from the files for display or searching purposes. In contrast, the Gnutella protocol relies on file names or properties or else data extracted from inside files to describe content. However, with A/V files in particular, it is infeasible to store all the information required for display and search purposes within the filenames of clips, and there is no descriptive data within the files, so the searching is ineffective.

An example of a description file in XML format is shown in FIG. 4. The text in bold within each XML element is the data which is specific to each description file. The first XML element identified by the tag <id> is the clip ID. The further XML elements are items of descriptive information, for example the name of the clip and keywords for the clip. As the protocol is concerned particularly with content data which is image data, the descriptive information includes information specifying the nature of the image data, for example the format, resolution and colour space of the image data. Encrypted metadata can also be included in the file, for example, rights and billing information. The description file does not need to contain rudimentary file information, as this is detected by the application. The file names, creation dates and file sizes are loaded into an internal file list when the application starts up. This means that if files are edited, removed or added to the subfolder, the index file does not need to be updated.

When a clip is downloaded, the content folder naming and structure is maintained and the description file is also downloaded and saved to the content folder. This facilitates the re-sharing of files, as the descriptive information does not have to be re-entered and is not subject to change.

In the present protocol, the application interprets the shared directory hierarchy and maintains a list of clips and information relating to those clips. Individual content files are uniquely identified on a peer by their associated clip ID and their file index.

The user interface in the application has been tailored to reflect these clip groupings.

The application has a window, for example as shown in FIG. 5, providing a view on the local content folders by displaying a subset of the descriptive information extracted from the description file. This abstraction hides the detail of the individual files, whilst giving enabling a user to manage all the files from a single place. This view also incorporates a clip previewer.

Figures 6, 7:
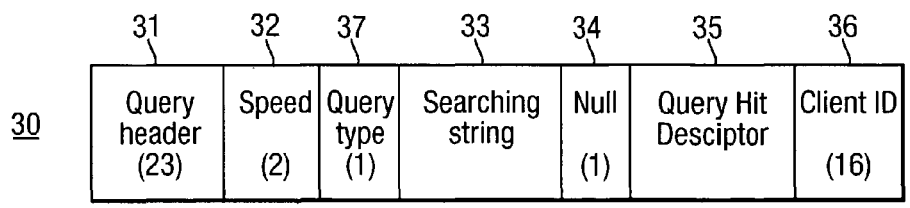
FIG. 6 is a window of the application for accepting inputs of descriptive information.
FIG. 7 is a diagram of the format of a basic search message.

The application manages the storage of the content files and provides an interface which allows a user to input at least some of the descriptive information. The application provides a window allowing the user to specify one or more files to be stored as a clip and a further window, for example as shown in FIG. 6, containing fields for accepting inputs from the user of respective elements of the descriptive information. Based on these inputs, the application generates the description file in XML format. In addition to the descriptive information input by the user, the application may generate some of the descriptive information automatically, for example based on the properties of the content files. The application also generates the clip ID as a UMID. Then, the application stores the generated description file and the content file or files specified by the user in the respective content folder.

The descriptive information may be input as part of a water-marking process for the content files.

There will now be described the searching process of the present protocol.

Searching uses search query messages and hit messages (being response messages in response to a search query message) which are passed through the network in the same manner as in the Gnutella protocol, as described above. In particular, requesting peers generate and transmit search query messages which are passed through the network. Peers storing content data, as well as passing the message on, search for content data matching the search criteria, and in the event of a match generate and transmit a hit message which is passed back through the network to the respective requesting peer from which the search message originated. However, there are modifications to the nature of the messages and the processing performed within each peer in response to the messages, as follows.

The present protocol in fact implements two types of search, referred to as basic and advanced.

The basic search is fundamentally the same as the search in the Gnutella protocol and does not use the descriptive information in the description file.

FIG. 7 illustrates the basic search query message 30 generated and transmitted by a requesting peer. In FIG. 7, and also FIGS. 8, 10 and 12 which show further messages, fields present in the corresponding Gnutella message are shaded lightly and fields added in the present protocol are shaded darkly. The basic search query message 30 includes the following fields in common with the Gnutella protocol: query header field 31 which includes a unique message identifier, message type (in this case a query), and TTL value; speed field 32; search string field 33; null field 34; query hit descriptor field 35 and peer ID field 36. In addition, the basic search query message 30 includes a query type field 37 indicating the query as being of the basic type.

Figure 8:
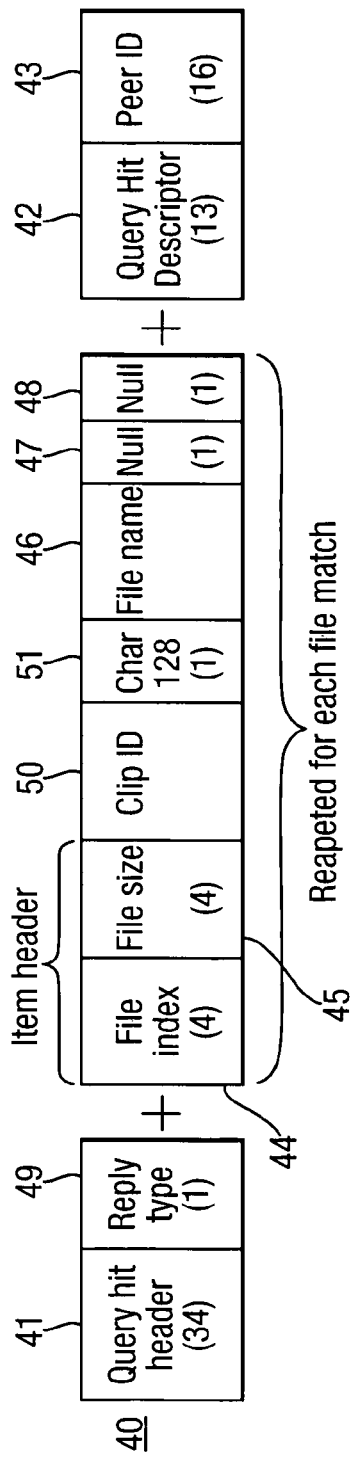
FIG. 8 is a diagram of the format of a basic query message.

The search performed by peers on receipt of the basic search query message 30 is the same as in the Gnutella protocol. In the event of a match, those peers generate a basic hit message 40 which is illustrated in FIG. 8. The basic hit message 40 includes the following fields in common with the Gnutella protocol: query hit header field 41; query hit descriptor field 42; and peer ID field 43; and also, in a portion repeated for each match: file index field 44; file size field 45; file name field 48; and two null fields 47 and 48. In addition, the basic hit message 40 includes a response type field 49 indicating the response as being of the basic type. Lastly, the basic hit message 40 includes, in each portion repeated for each match, the clip ID field 50 and a character 51 to separate the clip ID field 50 from the file name field 48. Thus individual content files are uniquely identified by the clip ID in the clip ID field 50 and the file index in the file index field 44.

On receipt of hit messages, the requesting peer may download the individual content files identified in a respective hit message by connecting directly to the respective peer from which the hit message originated using an HTTP connection. The download of each content file is managed by a respective shell, which in turn is responsible for monitoring the progress of a single socket receiving the download.

The advanced search uses the descriptive information in the description file, in order to support the abstraction of content files into clips. The advanced search is illustrated in FIG. 9.

In step S1, a requesting peer 11 generates and transmits an advanced search query message 60. FIG. 10 illustrates the advanced search query message 60. The advanced search query message 60 includes the following fields in common with the Gnutella protocol: query header 61; speed 62; null 63; query hit descriptor 64 and peer ID 65. In addition, the advanced search query message 60 includes a query type field 66 indicating the query as being of the advanced type. Lastly, the advanced search query message 60 includes a search criteria field 67 containing search criteria in XML format. This replaces the search string 33 in the basic search query message 30.

The application provides a window, for example as shown in FIG. 11, containing fields for accepting inputs from the user, the fields corresponding to the respective elements of the descriptive information in a description file. Based on these inputs, the application running on the requesting peer 11 generates the criteria 30 field 67 in XML format.

Each respective peer 12 storing content data performs steps S2 to S6 on receipt of an advanced search query message 60.

In step S2, the respective peer 12 records the advanced search query.

In step S3, the respective peer 12 transmits on the advanced search query message 60 for passages through the network.

In step S4, the respective peer 12 performs the search by comparing the search criteria in the search criteria field 67 of the advanced search query message 60 with the descriptive information in the description file of each content folder stored on the respective peer 12. In particular, the descriptive information which is in XML format is parsed with respect to the data in the search criteria field 67. This new searching facility allowed detailed searches to be carried out based on any of the descriptive information. In the event of the comparison giving a match between the search criteria and the descriptive information, the respective peer 12 responds by proceeding to steps S5 and S6.

In step S5, the origin of the advanced search query message 60 is looked up.

Figure 12:
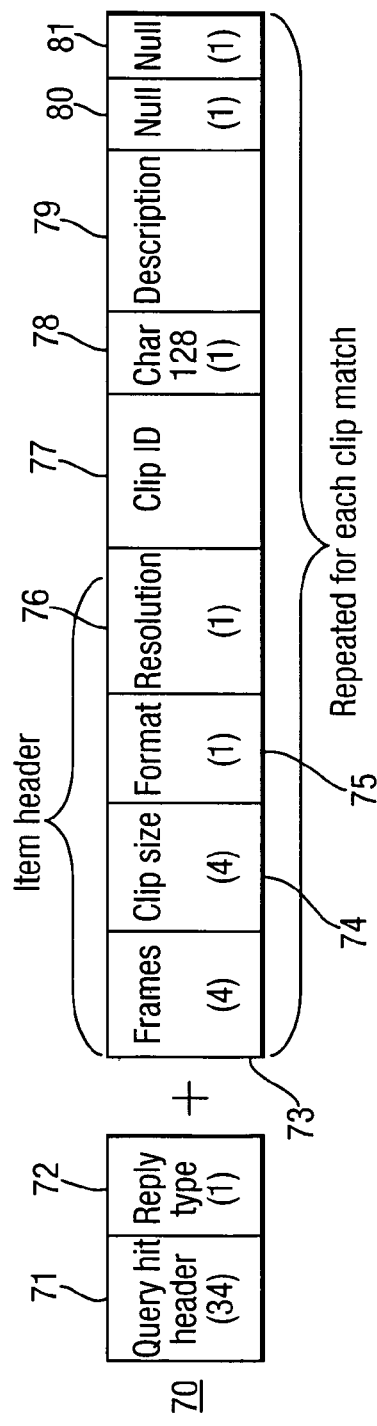
FIG. 12 is a diagram of the format of an advanced query message.

In step S6, the respective peer 12 generates an advanced hit message 70 and transmits it for passage back through the network to the requesting peer 11. FIG. 12 illustrates the advanced hit message 70. The advanced hit message 70 includes a query hit descriptor field 71 in common with the Gnutella protocol, but otherwise is different. The advanced hit message 70 includes a response type field 72 indicating the response as being of the advanced type. The advanced hit message 70 further includes a subset of the descriptive information taken from the description file for each matching content file. In particular, the advanced hit message 70 includes, in a portion repeated for each match, the following fields: frames field 73 indicating the number of frames in the clip; clip size field 74 indicating the size of the clip; format field 75 indicating the format of the clip; resolution field 75 indicating the resolution of the clip; clip ID field 77; a character 78 to separate the clip ID field 77 from the following field; description field 79; and two null fields 80 and 81.

Thus the content file or files in the matching content folder are not individually identified but are abstracted as a whole, by means of the clip ID in the clip ID field 77 and other descriptive information taken from the description file. This provides sufficient information to distinguish between clips at a high level, but at the same time limits the amount of data in the advanced hit message 70. In this way, the abstraction into a clips reduces the amount of bandwidth occupied by searches. This is particularly advantageous for A/V content data.

In step S7, the requesting peer 11, on receipt of an advanced hit message 70 displays the clip ID in the clip ID field 77 together with the other descriptive information within the advanced hit message 70. For example, the application may provide a window as shown in FIG. 13 in which the results for three matching content folders are displayed.

There will now be described the download process used for an advanced search.

Downloading is controlled by the requesting peer 11. In general terms, after the requesting peer 11 receives an advanced hit message 70, it connects directly to the respective peer 12 from which the hit message originated using an HTTP connection, and then downloads one or more content files from the matching content folder identified by the clip ID 77 in the advanced hit message 70. There are two options for doing this.

The first option is for the requesting peer 11 to send a folder request message to the respective peer 12 storing the matching content folder. The respective peer 12, on receipt of the folder request message is then responsible for locating the relevant files and pushing them to the requesting peer 11 by connecting to the requesting peer 11 using an HTTP connection. Although simple for the requesting peer 11, this puts a heavy load on the respective peer 12 storing the matching content folder, in particular forcing it to manage the progress of all download requests as well as performing searches.

The second option is as follows. The general approach is that the requesting peer 11 managing the downloads and the respective peer 12 storing the matching content folder dealing only with individual file requests. This avoids placing the burden of managing downloads on the respective peer 12 storing the matching content folder and so is preferred to the first option.

Figure 14:
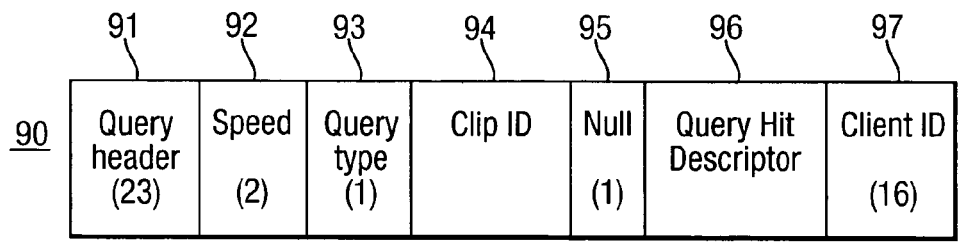
FIG. 14 is a diagram of the format of a file list query.

Given that the advanced hit message 70 abstracts the clip of one or more content files, the first stage of the download process is for the requesting peer 11 to retrieve a file list of each content file in the identified content folder. To achieve this the requesting peer 11 generates a file list query message 90, as shown in FIG. 14, and transmits it for passage through the network to the respective peer 12 from which the advanced hit message originated. The file list query message 90 contains the following fields: query header field 91; speed field 92; query type field 93; clip ID field 94; null field 95; query hit descriptor field 96 and peer ID field 97. The clip ID in the clip ID field 94 is taken from the clip ID field 77 of the advanced hit message 70 and therefore identifies the matching content folder in the respective peer 12. The requesting peer 11 logs the purpose of the query (for example for download or for display if the user merely wants to see the content files within a given matching content folder).

Figure 15:
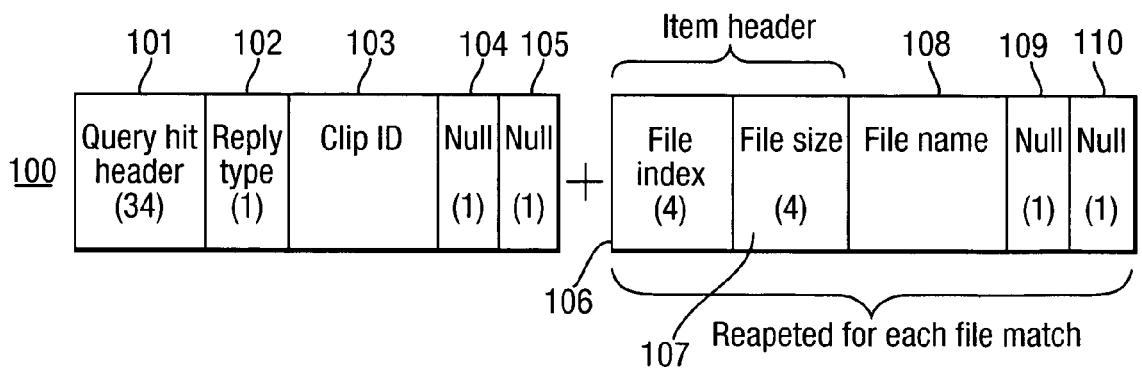
FIG. 15 is a diagram of the format of a file list response message.

On receipt of the file list query message 90, the respective peer 12 from which the advanced hit message 70 originated looks up the content folder identified by the clip ID field 94, and then generates a file list response message 100, as shown in FIG. 15, and transmits it for passage back through the network to the requesting peer 11. The file list response message 100 includes the following fields: query hit header field 101; response type field 102; clip ID field 103; and two null fields 104 and 105. The clip ID in the clip ID field 103 is the same as in the clip ID field 94 in the file list query message 90. The file list response message 100 includes the following fields in portions repeated for each file in the matching content folder: file index field 106; file size field 107; file name field 108; and two null fields 109 and 110. Each file is uniquely identifies by the respective file index in the file index field 106 together with the clip ID in the clip ID field 103.

On receipt of the file list response message 100, the requesting peer 11 from which the file list query message 90 originated looks up the purpose of the response in its log and process the results accordingly. If the purpose is display, the individual files identified in the file list response message are displayed. If the purpose is a download, the requesting peer 11 manages the downloads of the description file and each content file in the content folder, or alternatively individual content files selected based on inputs from the user. In a commercial context, this latter alternative is important, as users will only want to pay for the files they want to use. For example, video editors will only pay for the rights to the individual frames they need.

To effect the download, the requesting peer 11 creates respective download shells to download each desired file. These shells cause the requesting peer 11 to connect to the respective peer 12 storing the content data using an HTTP connection and to download the respective file. Thus within the requesting peer 11 each shell manages download of a single file and monitors a respective socket.

By downloading the description file together with the content files all data relating to the clip is passed on and could later be shared out and searched from the requesting peer 11. However, initially the downloaded files are stored in a download folder outside the shared folder storing content data on the requesting peer 11, in order to prevent downloads being shared automatically.

In the protocol described above, each executes the same peer-to-peer application. Thus each peer is capable of both (1) storing content data and (2) downloading content data. However this is not essential. A given peer might only download content data, or might only store content data. In either case, the given peer would only need part of the application described above.

The protocol described above is decentralised, in that there is no central peer storing an index of the content stored in plurality of other peers. The file structure of the present invention provides particular advantage in such a decentralised network. However, in principle, the file structure could be applied to a centralised peer-to-peer network, in which case the similar advantages in searching would be achieved.

The invention claimed is:

1. A peer-to-peer network of computers, which are interconnected so as to allow sharing of content data, comprising:

a plurality of computers configured to pass through the network messages that originate from respective requesting computers;

respective computers in the network are configured to store in a memory content files of content data in a file structure comprising a plurality of content folders, each content folder containing any number of content files, wherein:

at least one of the content folders contains a plurality of content files having related content data, and each content folder that contains at least one content file, including the at least one of the content folders that contains a plurality of content files, further contains a corresponding description file, wherein:

the corresponding description file is a separate file from the at least one content file and from the plurality of content files, the corresponding description file contains descriptive information describing the plurality of content files that are stored in the same content folder as the corresponding description file, in the case of the content folder that contains the plurality of content files, and the corresponding description file contains descriptive information describing the at least one content file that is stored in the same content folder as the corresponding description file, in the case of the content folder that contains the at least one content file;

the respective requesting computers are configured to transmit a search query message that specifies search criteria for passage through the network; and the respective computers configured to store content files are further configured to, after receipt of the search query message that specifies search criteria, compare the search criteria with the descriptive information contained in the corresponding description file in each content folder that contains at least one content file, including the at least one of the content folders that contains a plurality of content files, and in an event of there being a matching content folder, to transmit a hit message identifying the matching content folder for passage back through the network to the respective requesting computer, wherein the corresponding description file further contains identification information and the hit message identifies the matching content folder by including the identification information of the description file that contains the descriptive information matching the search criteria, and wherein the identification information contained in the corresponding description file is unique within the peer-to-peer network.

2. The peer-to-peer network of computers according to claim 1, wherein the content data includes image data and the descriptive information includes information specifying the nature of the image data.

3. The peer-to-peer network of computers according to claim 1, wherein the file structure comprising the plurality of content folders is configured within in a common folder.

4. The peer-to-peer network of computers according to claim 1, wherein the respective computers configured to store in the memory the content files of the content data are further configured to:

accept input from a user specifying the at least one content file or the plurality of content files to be stored, and input from the user of at least part of the descriptive information;

include the descriptive information input by the user in the corresponding description file;

store the corresponding description file and the plurality of content files in the same content folder as the corresponding description file, in the case of the content folder that contains the plurality of content files; and store the corresponding description file and the at least one content file in the same content folder as the corresponding description file, in the case of the content folder that contains the at least one content file.

5. The peer-to-peer network of computers according to claim 1, wherein the corresponding description file contains the descriptive information in Extensible Markup Language format.

6. The peer-to-peer network of computers according to claim 5, wherein the search criteria is in Extensible Markup Language format and the respective computers configured to store in the memory the content files are further configured to compare the search criteria with the descriptive information contained in the corresponding description file by parsing the descriptive information with respect to the search criteria.

7. The peer-to-peer network of computers according to claim 1, wherein the respective requesting computers are configured to, after receipt of the hit message, connect directly to the respective computer that generated the hit message and:

download the plurality of content files in the matching content folder, in the case of the matching content folder being the content folder that contains the plurality of content files, and download the at least one content file in the matching content folder, in the case of the matching content folder being the content folder that contains the at least one content file.

8. The peer-to-peer network of computers according to claim 1, wherein the respective requesting computers are configured to transmit, after receipt of the hit message, a file list query message identifying the matching content folder for passage to the respective computer that generated the hit message, and the respective computers configured to store in the memory the content files are further configured to, after receipt of the file list query message, transmit for passage back through the network, to the respective requesting computer that transmitted the file list query message identifying the matching content folder, a file list response message that:

identifies the plurality of content files in the matching content folder, in the case of the matching content folder being the content folder that contains the plurality of content files, and identifies the at least one content file in the matching content folder, in the case of the matching content folder being the content folder that contains the at least one content file.

9. The peer-to-peer network of computers according to claim 8, wherein the respective requesting computers are further configured to, after receipt of the file list response message, accept input from a user specifying the at least one content file or the plurality of content files specified in the file list response message and to connect directly to the respective computer that generated the hit message and:

download the plurality of content files specified by the user, in the case of the matching content folder being the content folder that contains the plurality of content files, and download the at least one content file specified by the user, in the case of the matching content folder being the content folder that contains the at least one content file.

10. A computer configured to connect into a peer-to-peer network of computers that are interconnected so as to allow sharing of content data, comprising:

a memory configured to store the content data;

a processor configured to execute instructions; and an interface configured to communicatively connect the computer to the peer-to-peer network, wherein the computer is configured to pass through the network messages that originate from respective requesting computers;

the computer is configured to store in the memory content files of the content data in a file structure comprising a plurality of content folders, each content folder containing any number of content files, wherein:

at least one of the content folders contains a plurality of content files having related content data, and each content folder that contains at least one content file, including the at least one of the content folders that contains a plurality of content files, further contains a corresponding description file, wherein:

the corresponding description file is a separate file from the at least one content file and from the plurality of content files, and the corresponding description file contains descriptive information describing the plurality of content files that are stored in the same content folder as the corresponding description file, in the case of the content folder that contains the plurality of content files, and the corresponding description file contains descriptive information describing the at least one content file that is stored in the same content folder as the corresponding description file, in the case of the content folder that contains the at least one content file;

the messages that the computer is configured to pass through the network include a search query message that specifies search criteria; and the computer is configured to, after receipt of the search query message that specifies search criteria, compare the search criteria with the descriptive information contained in the corresponding description file in each content folder that contains at least one content file, including the at least one of the content folders that contains a plurality of content files, and in the event of there being a matching content folder, to transmit a hit message identifying the matching content folder for passage back through the network to the respective requesting computer, wherein the corresponding description file further contains identification information and the hit message identifies the matching content folder by including the identification information of the description file that contains the descriptive information matching the search criteria, and wherein the identification information contained in the corresponding description file is unique within the peer-to-peer network of computers.

11. The computer according to claim 10, wherein content data includes image data and descriptive information includes information specifying the nature of the image data.

12. The computer according to claim 10, wherein the file structure comprising the plurality of content folders is configured within in a common folder.

13. The computer according to claim 10, wherein the computer is further configured to:

accept input from a user specifying the at least one content file or the plurality of content files to be stored, and input from the user of at least part of the descriptive information;

include the descriptive information input by the user in the corresponding description file;

store the corresponding description file and the plurality of content files in the same content folder as the corresponding description file, in the case of the content folder that contains the plurality of content files; and store the corresponding description file and the at least one content file in the same content folder as the corresponding description file, in the case of the content folder that contains the at least one content file.

14. The computer according to claim 10, wherein the corresponding description file contains the descriptive information in Extensible Markup Language format.

15. The computer according to claim 14, wherein the search criteria is in Extensible Markup Language format and the computer is further configured to compare the search criteria with the descriptive information contained in the corresponding description file by parsing the descriptive information with respect to the search criteria.

16. The computer according to claim 10, wherein the messages that the computer is configured to pass through the network include a file list query message identifying the matching content folder, and the computer is further configured to, after receipt of the file list query message, transmit for passage back through the network, to the respective requesting computer that transmitted the file list query message identifying the matching content folder, a file list response message that:

identifies the plurality of content files in the matching content folder, in the case of the matching content folder being the content folder that contains the plurality of content files, and identifies the at least one content file in the matching content folder, in the case of the matching content folder being the content folder that contains the at least one content file.

17. The computer according to claim 10, wherein the computer is further configured to transmit the search query message that specifies the search criteria for passage through the network for causing other computers in the peer-to-peer network to compare the search criteria with the descriptive information contained in the corresponding description file in content folder that contains at least one content file, including the at least one of the content folders that contains a plurality of content files, that are stored on the other computers, and in the event of there being a matching content folder stored on at least one of the other computers, to transmit at least one other hit message identifying the matching content folder stored on the at least one of the other computers for passage back through the network to the computer.

18. The computer according to claim 17, wherein the computer is configured to, after receipt of the at least one other hit message connect directly to the at least one of the other computers that generated the at least one other hit message and:

download the plurality of content files in the matching content folder stored on the at least one of the other computers, in the case of the matching content folder being the content folder that contains the plurality of content files, and download the at least one content file in the matching content folder stored on the at least one of the other computers, in the case of the matching content folder being the content folder that contains the at least one content file.

19. The computer according to claim 17, wherein the computer is further configured to, after receipt of the at least one other hit message identifying the matching content folder stored on the at least one of the other computers, transmit a file list query message identifying the matching content folder for passage to the at least one of the other computers that generated the at least one other hit message, for causing the at least one of the other computers to transmit for passage back through the network to the computer a file list response message that:

identifies the plurality of content files in the matching content folder, in the case of the matching content folder being the content folder that contains the plurality of content files, and identifies the at least one content file in the matching content folder, in the case of the matching content folder being the content folder that contains the at least one content file.

20. The computer according to claim 19, wherein the computer is further configured to, after receipt of the file list response message, accept input from a user specifying the at least one content file or the plurality of content files specified in the file list response message and to connect directly to the at least one of the other computers that generated the at least one other hit message and:

download the plurality of content files specified by the user, in the case of the matching content folder being the content folder that contains the plurality of content files, and download the at least one content file specified by the user, in the case of the matching content folder being the content folder that contains the at least one content file.

21. A method implemented by a computer communicatively connected to a peer-to-peer network of plural computers that are interconnected for sharing of content data and for storing the content data, the method comprising:

passing through network messages that originate from respective requesting computers;

storing, in a memory of the computer, content files of the content data on respective computers in a file structure comprising a plurality of content folders, each content folder containing any number of content files, wherein:

at least one of the content folders contains a plurality of content files having related content data, and each content folder that contains at least one content file, including the at least one of the content folders that contains a plurality of content files, further contains a corresponding description file, wherein:

the corresponding description file is a separate file from the at least one content file and from the plurality of content files, and the corresponding description file contains descriptive information describing the plurality of content files that are stored in the same content folder as the corresponding description file, in the case of the content folder that contains the plurality of content files, and the corresponding description file contains descriptive information describing the at least one content file that is stored in the same content folder as the corresponding description file, in the case of the content folder that contains the at least one content file;

wherein the messages that the computer is configured to pass through the network include a search query message that specifies search criteria; and comparing, after receipt of the search query message that specifies search criteria, the search criteria with the descriptive information contained in the corresponding description file in content folder that contains at least one content file, including the at least one of the content folders that contains a plurality of content files, and in the event of there being a matching content folder, transmitting a hit message identifying the matching content folder for passage back through the network to the respective requesting computer, wherein the corresponding description file further contains identification information and the hit message identifies the matching content folder by including the identification information of the description file that contains the descriptive information matching the search criteria, and wherein the identification information contained in the corresponding description file is unique within the peer-to-peer network.

22. A non-transitory computer readable storage medium having executable instructions stored thereon, which when executed by a computer communicatively connected to a peer-to-peer network of plural computers that are interconnected for sharing of content data and for storing the content data, cause the computer to implement a method comprising:

passing through network messages that originate from respective requesting computers;

storing, in a memory of the computer, content files of the content data on respective computers in a file structure comprising a plurality of content folders, each content folder containing any number of content files wherein:

at least one of the content folders contains a plurality of content files having related content data, and each content folder that contains at least one content file, including the at least one of the content folders that contains a plurality of content files, further contains a corresponding description file, wherein:

the corresponding description file is a separate file from the at least one content file and from the plurality of content files, and the corresponding description file contains descriptive information describing the plurality of content files that are stored in the same content folder as the corresponding description file, in the case of the content folder that contains the plurality of content files, and the corresponding description file contains descriptive information describing the at least one content file that is stored in the same content folder as the corresponding description file, in the case of the content folder that contains the at least one content file, wherein the messages that the computer is configured to pass through the network include a search query message that specifies search criteria; and comparing, after receipt of the search query message that specifies search criteria, the search criteria with the descriptive information contained in the corresponding description file in each content folder that contains at least one content file, including the at least one of the content folders that contains a plurality of content files, and in the event of there being a matching content folder, transmitting a hit message identifying the matching content folder for passage back through the network to the respective requesting computer, wherein the corresponding description file further contains identification information and the hit message identifies the matching content folder by including the identification information of the description file that contains the descriptive information matching the search criteria, and wherein the identification information contained in the corresponding description file is unique within the peer-to-peer network.

* * * * *